(12) United States Patent
Weyerhaeuser et al.

(10) Patent No.: US 9,916,374 B2
(45) Date of Patent: Mar. 13, 2018

(54) ON-THE-FLY CALCULATION SCENARIO PROVISION DURING QUERY RUNTIME

(71) Applicants: Christoph Weyerhaeuser, Heidelberg (DE); Tobias Mindnich, Walldorf (DE); Daniel Baeumges, Viersen (DE); Johannes Merx, Heidelberg (DE)

(72) Inventors: Christoph Weyerhaeuser, Heidelberg (DE); Tobias Mindnich, Walldorf (DE); Daniel Baeumges, Viersen (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 654 days.

(21) Appl. No.: 13/907,673

(22) Filed: May 31, 2013

(65) Prior Publication Data
US 2014/0358899 A1    Dec. 4, 2014

(51) Int. Cl.
*G06F 7/00*    (2006.01)
*G06F 17/30*    (2006.01)

(52) U.S. Cl.
CPC .. *G06F 17/30592* (2013.01); *G06F 17/30333* (2013.01)

(58) Field of Classification Search
None
See application file for complete search history.

(56) References Cited

U.S. PATENT DOCUMENTS

| | | |
|---|---|---|
| 6,169,992 B1 | 1/2001 | Beall et al. |
| 6,484,162 B1 * | 11/2002 | Edlund ............. G06F 17/30395 |
| 6,609,123 B1 | 8/2003 | Cazemier et al. |
| 6,618,719 B1 | 9/2003 | Andrei |
| 7,779,031 B2 * | 8/2010 | Grosset ............. G06F 17/30592 707/720 |
| 8,027,969 B2 | 9/2011 | Peh et al. |
| 8,195,643 B2 | 6/2012 | Weyerhaeuser et al. |
| 2006/0212418 A1 * | 9/2006 | Dettinger .......... G06F 17/30398 |
| 2006/0235836 A1 | 10/2006 | Dettinger et al. |
| 2010/0287014 A1 | 11/2010 | Gaulin et al. |
| 2010/0306188 A1 | 12/2010 | Cunningham et al. |
| 2011/0022583 A1 | 1/2011 | Pennell et al. |
| 2011/0125778 A1 * | 5/2011 | Kubo ................. G06F 17/30516 707/769 |

(Continued)

FOREIGN PATENT DOCUMENTS

EP    1505520 A2    2/2005

OTHER PUBLICATIONS

Danielle Larocca, Creating calculation fields in your report (How to Eliminate Duplicate Line Repoting in query Tools) Dec. 8, 2011.*

*Primary Examiner* — Thu Nga Nguyen
(74) *Attorney, Agent, or Firm* — Mintz Levin Cohn Ferris Glovsky and Popeo, P.C.

(57) ABSTRACT

A query is received by a database server from a remote application server. The query encapsulates an on-the-fly calculation scenario that defines a data flow model that includes one or more calculation nodes. Thereafter, the database server instantiates the on-the-fly calculation scenario. The database server then executes the operations defined by the calculation nodes of the instantiated calculation scenario to result in a responsive data set so that the database server can provide the data set to the application server. Related apparatus, systems, methods, and articles are also described.

19 Claims, 4 Drawing Sheets

(56) References Cited

U.S. PATENT DOCUMENTS

| | | | |
|---|---|---|---|
| 2011/0161940 A1* | 6/2011 | Brunswig | G06F 8/41 |
| | | | 717/139 |
| 2011/0173224 A1 | 7/2011 | Toledo et al. | |
| 2012/0109934 A1* | 5/2012 | Weyerhaeuser | G06F 17/30463 |
| | | | 707/713 |
| 2012/0290603 A1 | 11/2012 | Ickman et al. | |
| 2013/0166497 A1* | 6/2013 | Schroetel | G06F 17/30539 |
| | | | 707/602 |
| 2014/0075408 A1* | 3/2014 | Korat | G06F 9/4436 |
| | | | 717/104 |

\* cited by examiner

ON-THE-FLY CALCULATION SCENARIO PROVISION DURING QUERY RUNTIME

TECHNICAL FIELD

The subject matter described herein relates to on-the-fly provisions of calculation scenarios during query runtime.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Engines can sometimes be employed by applications and/or domain specific languages in order to effect such calculations.

SUMMARY

In one aspect, a query is received by a database server from a remote application server. The query encapsulates an on-the-fly calculation scenario that defines a data flow model that includes one or more calculation nodes. Each calculation node defines one or more operations to execute on the database server. Thereafter, the database server instantiates the on-the-fly calculation scenario. The database server then executes the operations defined by the calculation nodes of the instantiated calculation scenario to result in a responsive data set so that the database server can provide the data set to the application server.

At least a portion of paths and/or attributes defined by the calculation scenario may not be required to respond to the query such that the instantiated calculation scenario omits the paths and attributes defined by the calculation scenario that are not required to respond to the query. At least one of the calculation nodes can filter results obtained from the database server. At least one of the calculation nodes can sort results obtained from the database server.

The on-the-fly calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool.

An input for each calculation node can include one or more of: a physical index, a join index, an OLAP index, and another calculation node. Each calculation node can have at least one output table that is used to generate the final result data set. At least one calculation node can consume an output table of another calculation node.

The execution of the instantiated calculation scenario can include forwarding the query to a calculation node in the calculation scenario that is identified as a default node. The calculation scenario can include database metadata. The calculation engine can invoke an SQL processor for executing set operations.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, overhead for applications using a calculation engine are reduced when they utilize the calculation scenarios just for one single query. The overhead is reduced by several factors: reduction of server roundtrips for applications such as business warehouse (BW) application, complete removal of access to shared database resources such as metadata catalog, and removal of caching such single used calculation scenarios.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
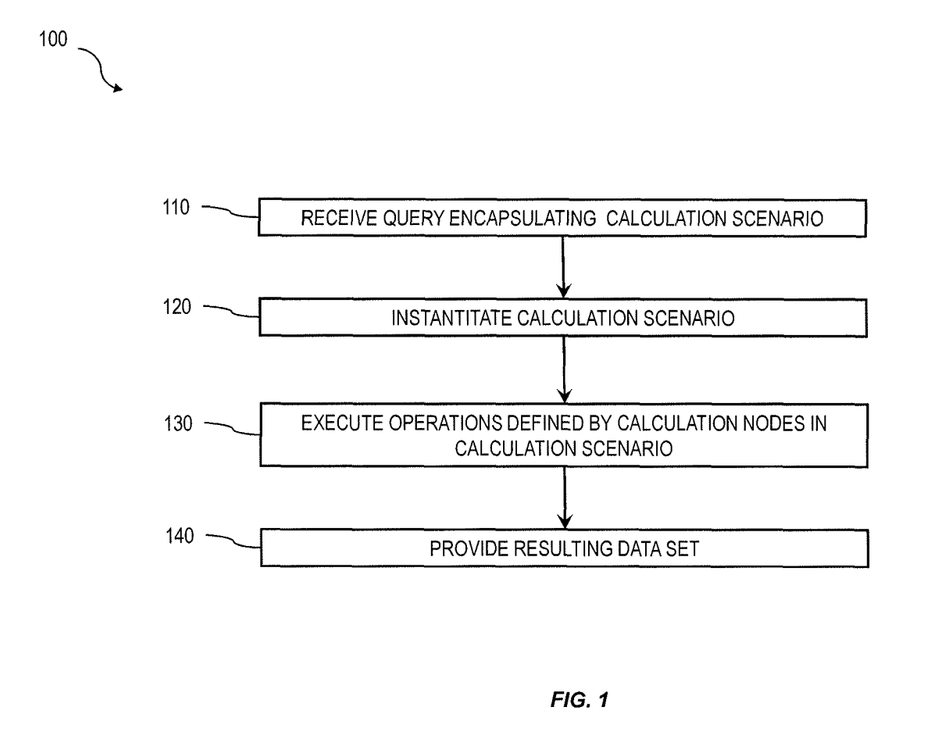
FIG. 1 is a process flow diagram illustrating a method for providing, on-the-fly, scenario provision during query runtime.

FIG. 1 is a process flow diagram 100 illustrating a method in which, at 110, a query encapsulating an on-the-fly calculation scenario is received by a database server from a remote application server. The on-the-fly calculation scenario defines a data flow model that includes two or more calculation nodes. Each calculation node defines one or more operations to execute on the database server. Thereafter, at 120, the database server instantiates the on-the-fly calculation scenario and, at 130, executes the operations defined by the calculation nodes of the instantiated calculation scenario to result in a responsive data set. This data set is then provided, at 140, by the database server to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless pathes and attributes (that are not requested) within the calculation scenario. This compaction reduces calculation time and also minimizes the total amount of data that must be processed.

Figure 2:
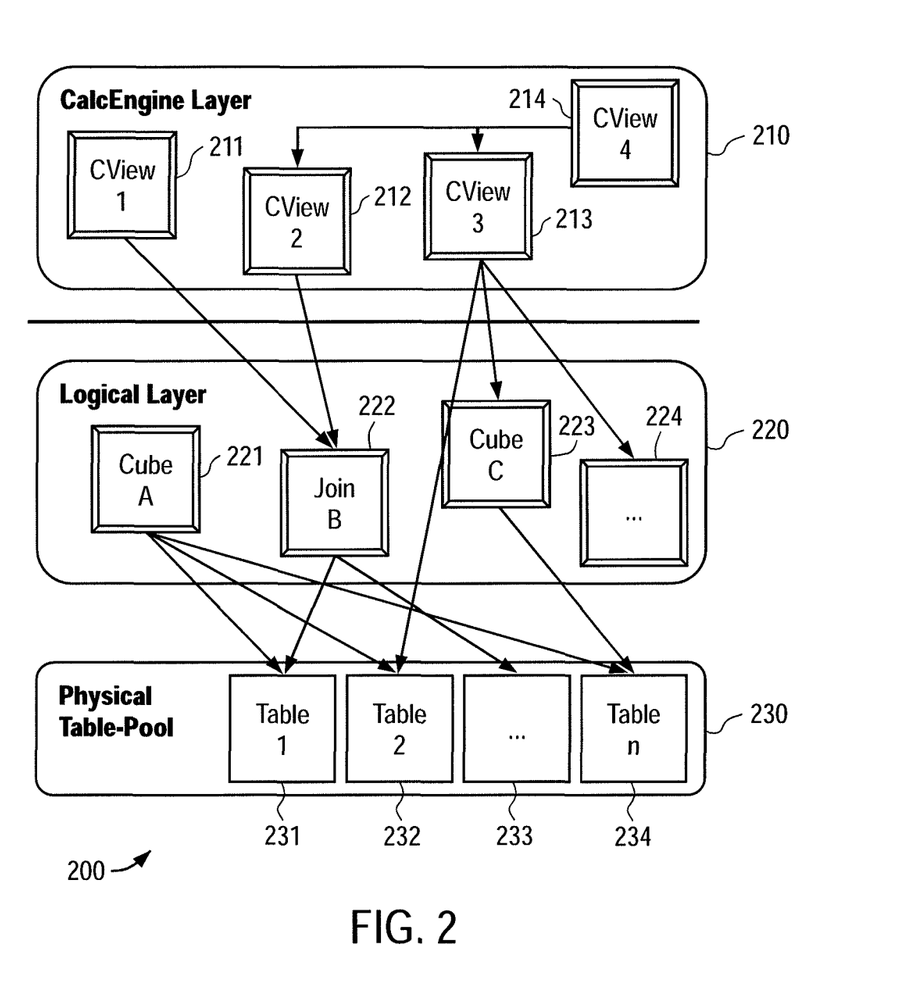
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

On-the-fly calculation scenarios as used herein can be seen as anonymous calculation scenarios in that they do not require an identification because they are not registered in the database catalog. On-the-fly calculation scenarios are only used once, so they are not stored in the database. Thus implies that an on-the-fly calculation scenario cannot be referenced from another calculation scenario but an on-the-fly calculation scenario can reference another persisted calculation scenario (via a calculation node 211-214 in the on-the-fly calculation scenario). An on-the-fly calculation scenario can also reference database objects from the logical layer (220) and/or the table pool (230).

Further details regarding calculation engine architecture and calculation scenarios can be found in U.S. Pat. No. 8,195,643, the contents of which are hereby fully incorporated by reference.

Figure 3:
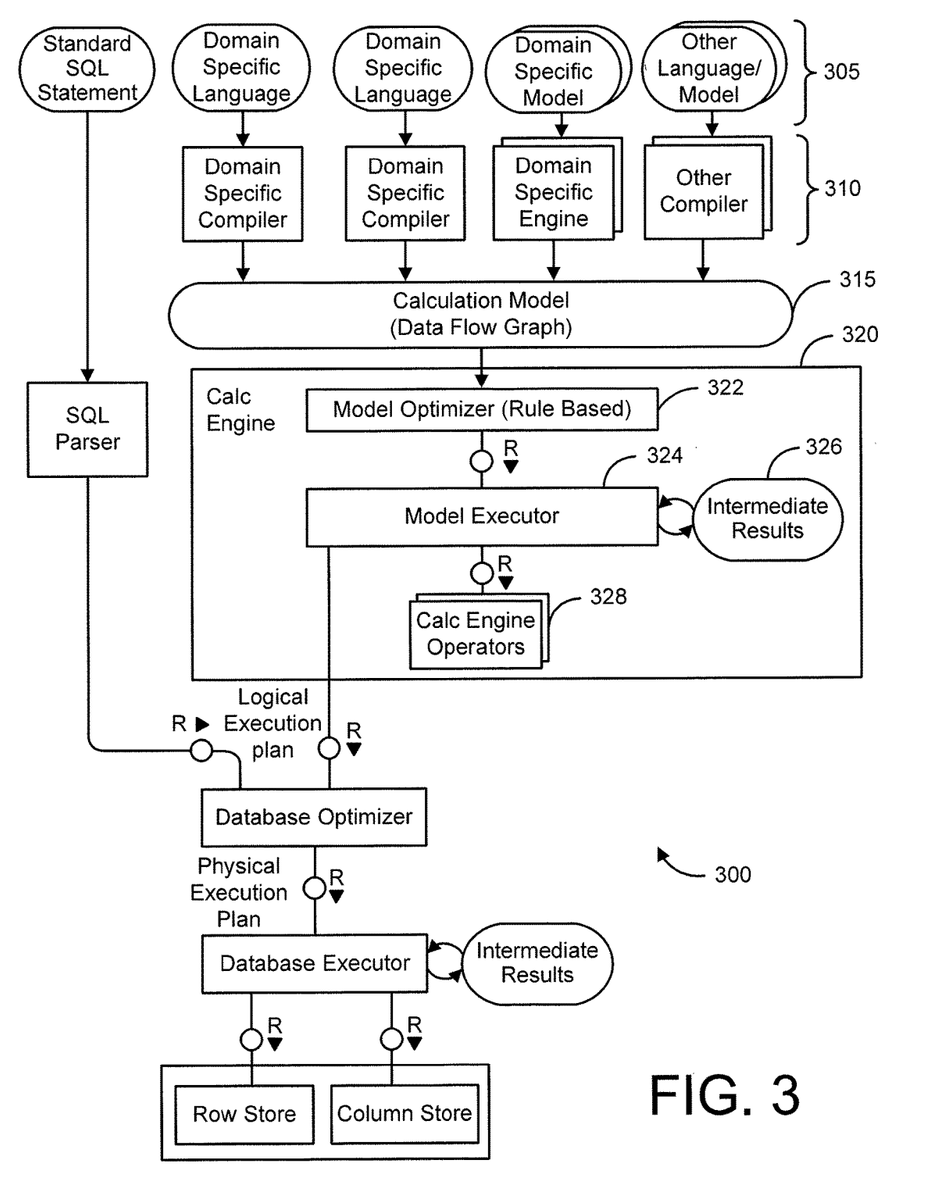
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The subject matter described herein provides many advantages. For example, the current subject matter obviates issues arising from an arrangement as described here: a single MDX query on top of an analytical view can be translated into a calculation scenario, several (catalog) column views on top of this scenario, and a query using the created calculation views. After query execution a calculation engine can return the result and the MDX layer can drop the calculation scenario as well as the appropriate calculation views. This arrangement also holds for different types of business warehouse (BW) queries including multiprovider queries. One of these queries can be translated into the following sequence: create calculation scenario, create calculation view(s), query calculation view (search), drop calculation view(s), and drop calculation scenario.

In general, without the subject matter described herein (namely on-the-fly scenario provision during query runtime) a search on top of a calculation scenario always requires an appropriate calculation view on top of this calculation scenario. So in general the following sequence is executed: create calculation scenario, create calculation view(s), query calculation views (search), drop calculation view(s), and drop calculation scenario.

The current subject matter addresses the above described method of execution by obviating/limiting the following: (i) several turnarounds for the executing layer (e.g., MDX, BW); (ii) several catalog accesses, e.g. for creating the calculation view, dropping it, and accessing it during query runtime (every access also means acquiring locks on the appropriate catalog structures); and (iii) several calculation engine layer accesses, e.g. creating the scenario, dropping it, and accessing it during query runtime (every access also means acquiring locks on the appropriate Calculation Engine structure).

The current subject matter provides a new way of executing a query on top of a calculation scenario by providing the appropriate calculation scenario included in the actual query on top without the need of creating any new column view or calculation scenario. On one hand, this arrangement heavily reduces the overhead of accessing shared database resources such as a metadata catalog which can be required to create the column views and to call the appropriate drops. On the other hand, the current subject matter reduces the number of server roundtrips: instead of five turnarounds for create calculation scenario, create calculation view(s), query calculation view (search), drop calculation view(s), and drop calculation scenario, only one single turnaround is required.

In addition the current subject matter makes a query nearly lock free: no locks for catalog access and calculation engine structure access are required. Also no garbage collection is needed for on-the-fly scenarios within the calculation engine and the calculation engine cache is not polluted by short-living calculation scenarios. All of these factors result in a big performance improvement by reducing metadata and lock overhead to an absolute minimum.

Figure 4:
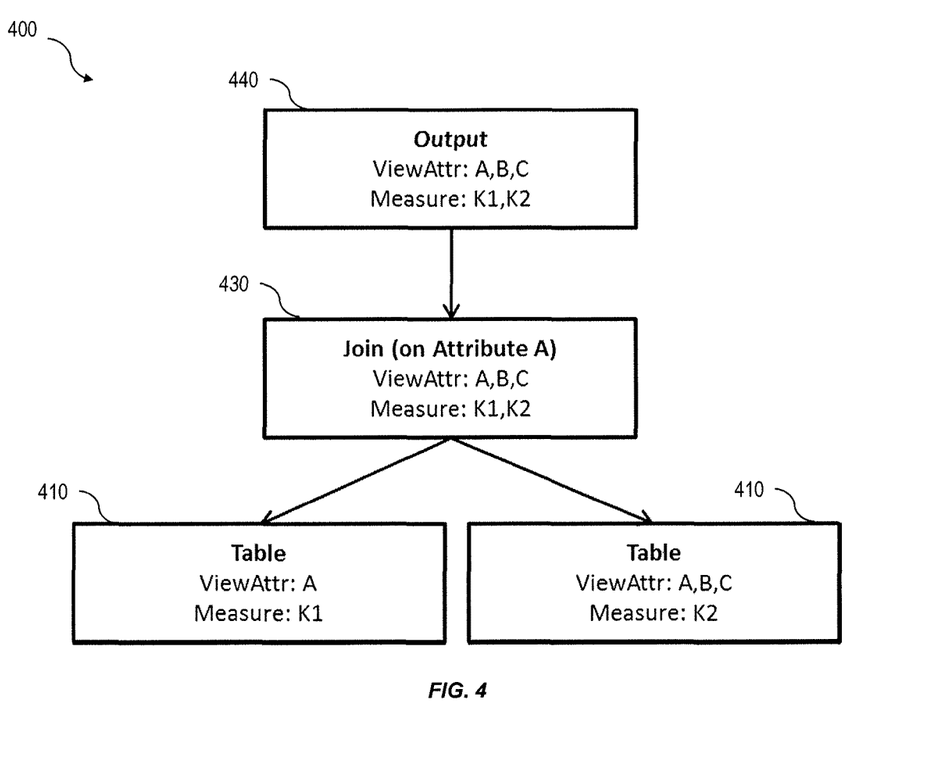
FIG. 4 is a diagram illustrating a calculation scenario.

FIG. 4 is a diagram of a calculation scenario 400 with a plurality of nodes 410-440 that each define various operations. A first node 410 provides a view of an attribute A in a table along keyfigure K1. A second node 420 provides a view of attributes A, B, C in the table along keyfigure K2. A third node 430 joins the view from both the first node 410 and the second node 420. A fourth node 440 provides an output of the join. With the current subject matter, the calculation scenario can be directly provided with the appropriate search on top, e.g. querying attribute A, B, and keyfigure K1. The calculation scenario itself can be provided, for example, by a JSON string-based format or the external XML string-based format.

As explained above, a calculation scenarios is created as well as a view on top and afterwards the calculation scenario can be queried e.g. with an SQL statement like 'SELECT A, B FROM calcscenario'. In that case, the calculation scenario was provided before the query was executed (on-the-fly calculation scenarios require both to be done in one step). This arrangement means that the scenario is provided exactly at the point where the query is executed because the scenario JSON/XML has to be provided together with the query.

This means the query does not only contain the requested attributes A, B, and keyfigure K1 but also the calculation scenario. Internally, the provided calculation scenario can be directly used by the calculation engine 320 for the instantiation process which uses the provided calculation scenario as well as the appropriate query for building the runtime scenario (via the model executor 324). The runtime calculation scenario can be optimized by the model optimizer 322 and subsequently executed by the model executor 324). At the end a result can be returned. As no external objects were created it is not required to delete any of these objects (i.e., the conventional arrangement of deleting a persisted calculation scenario is not required). This arrangement significantly improves performance by reducing runtime overhead.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive cdata and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as, a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and/or subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:

receiving, at a database server, a query encapsulating an on-the-fly calculation scenario by at least including a definition of the on-the-fly calculation scenario, the inclusion of the definition of the on-the-fly calculation scenario enabling the on-the-fly calculation scenario to be defined at a runtime of the query, the query being received from a remote application server, the on-the-fly calculation scenario defining a data flow model that includes one or more calculation nodes, each of the one or more calculation nodes defining one or more operations to execute on the database server, the query being on a responsive data set resulting from executing the one or more operations on the database server, and the definition of the on-the-fly calculation scenario being used once for the query and is not persisted in memory for reuse by another query;

instantiating, based at least on the query including the definition of the one-the-fly calculation scenario, the on-the-fly calculation scenario, the on-the-fly calculation scenario being instantiated without generating a corresponding calculation view, and the instantiation of the on-the-fly calculation scenario including removal of at least one of a path and an attribute defined by the on-the-fly calculation scenario but are not requested by the query;

performing, by the database server, the one or more operations defined by the one or more calculation nodes of the instantiated calculation scenario, the execution of the one or more operations resulting in the responsive data set;

executing the query on the responsive data set; and providing, to the application server, a result of the execution of the query.

2. A method as in claim 1, wherein at least one of the one or more calculation nodes filters results obtained from the database server.

3. A method as in claim 1, wherein at least one of the one or more calculation nodes sorts results obtained from the database server.

4. A method as in claim 1, wherein the calculation scenario is instantiated in a calculation engine layer by a calculation engine.

5. A method as in claim 4, wherein the calculation engine layer interacts with a physical table pool and a logical layer, the physical table pool comprising physical tables containing data to be queried, and the logical layer defining a logical meta model joining at least a portion of the physical tables in the physical table pool.

6. A method as in claim 1, wherein an input for at least one of the one or more calculation nodes comprises one or more of: a physical index, a join index, an Online Analytical Processing (OLAP) index, and another calculation node.

7. A method as in claim 6, wherein at least one of the one or more calculation nodes has at least one output table that is used to generate the data set.

8. A method as in claim 7, wherein at least one of the one or more calculation nodes consumes an output table of another calculation node.

9. A method as in claim 1, wherein the executing of the one or more operations defined by the one or more calculation nodes comprises:
forwarding the query to one of the one or more calculation nodes identified as a default calculation node at which the query should be executed.

10. A method as in claim 1, wherein the calculation scenario comprises database metadata.

11. A method as in claim 4, wherein the calculation engine invokes a structured query language (SQL) processor for executing set operations.

12. A system comprising:
a database server comprising memory and at least one data processor;
an application server in communication with and remote from the database server, the application server comprising memory and at least one data processor;
wherein the database server is configured to:
receive, from the application server, a query encapsulating an on-the-fly calculation scenario by at least including a definition of the on-the-fly calculation scenario, the inclusion of the definition of the on-the-fly calculation scenario enabling the on-the-fly calculation scenario to be defined at a runtime of the query, the on-the-fly calculation scenario defining a data flow model that includes one or more calculation nodes, each of the one or more calculation nodes defining one or more operations to execute on the database server, the query being on a responsive data set resulting from executing the one or more operations on the database server, and the definition of the on-the-fly calculation scenario being used once for the query and is not persisted in memory for reuse by another query;
instantiate, based at least on the query including the definition of the on-the-fly calculation scenario, the on-the-fly calculation scenario, the on-the-fly calculation scenario being instantiated without generating a corresponding calculation view, and the instantiation of the on-the-fly calculation scenario including removal of at least one of a path and an attribute defined by the on-the-fly calculation scenario but are not requested by the query;
perform the one or more operations defined by the one or more calculation nodes of the instantiated calculation scenario, the execution of the one or more operations resulting in the responsive data set;
execute the query on the responsive data set; and
provide, to the application server, a result of the execution of the query on the responsive data set.

13. A system as in claim 12, wherein the database server is further coupled to at least one other application server.

14. A system as in claim 12, wherein the database server comprises a calculation engine layer, a logical layer, and a physical table pool.

15. A system as in claim 14, wherein the calculation scenario is instantiated, by a calculation engine, at calculation engine layer.

16. A system as in claim 15, wherein the calculation engine layer is configured to interact with the physical table pool and the logical layer, the physical table pool comprising physical tables containing data to be queried, and the logical layer defining a logical meta model joining at least a portion of the physical tables in the physical table pool.

17. A system as in claim 12, wherein an input for at least one of the one or more calculation nodes comprises one or more of: a physical index, a join index, an Online Analytical Processing (OLAP) index, and another calculation node; wherein each calculation node has at least one output table that is used to generate the final result set.

18. A non-transitory computer program product storing instructions, which when executed by at least one data processor of at least one computing system, result in operations comprising:
receiving, at a database server, a query encapsulating an on-the-fly calculation scenario by at least including a definition of the on-the-fly calculation scenario, the inclusion of the definition of the on-the-fly calculation scenario enabling the on-the-fly calculation scenario to be defined at a runtime of the query, the query being received from a remote application server, the on-the-fly calculation scenario defining a data flow model that includes one or more calculation nodes, each of the one or more calculation nodes defining one or more operations to execute on the database server, the query being on a responsive data set resulting from executing the one or more operations on the database server, and the definition of the on-the-fly calculation scenario being used once for the query and is not persisted in memory for reuse by another query;
instantiating, based at least on the query including the definition of the one-the-fly calculation scenario, the on-the-fly calculation scenario, the on-the-fly calculation scenario being instantiated without generating a corresponding calculation view, and the instantiation of the on-the-fly calculation scenario including removal of at least one of a path and an attribute defined by the on-the-fly calculation scenario but are not requested by the query;
performing, by the database server, the one or more operations defined by the one or more calculation nodes of the instantiated calculation scenario, the execution of the one or more operations resulting in the responsive data set;
executing the query on the responsive data set; and
providing, to the application server, a result of the execution of the query.

19. A method as in claim 1, wherein the definition of the on-the-fly calculation scenario is in a JavaScript Object Notation (JSON) string-based format or in an Extensible Markup Language (XML) string-based format.

* * * * *